July 11, 1961 E. C. ELSNER 2,991,992
TIME DELAY DEVICE
Filed April 11, 1960

INVENTOR.
EDWIN C. ELSNER
BY
Huebner & Worrel
ATTORNEYS.

United States Patent Office 2,991,992
Patented July 11, 1961

2,991,992
TIME DELAY DEVICE
Edwin C. Elsner, Pasadena, Calif., assignor to Aeroquip Corporation, Jackson, Mich., a corporation of Michigan
Filed Apr. 11, 1960, Ser. No. 21,542
15 Claims. (Cl. 267—1)

This invention relates to a device for providing a time delay in the operation of other mechanical functions, and may be used, for instance, to slow down the biasing action of a spring on a movable body, such as a lever, a platform, a piston, a pivoted arm, or other structure, or to slow down movement in a mechanical system, such as a hydraulic system.

Considering in particular spring-biased structures, it is generally advantageous to use a stronger spring than required in order to insure longer life to the spring, but it may be that the faster biasing action of the stronger spring will result in undesirable speed of operation of the rest of the device. Similarly, it may be advantageous in a hydraulic fluid pressure system to provide a much more powerful flow pressure than is normally required for the operation of the system, in order to insure maintenance of at least minimum fluid pressure standards, but again said excess flow pressure may produce undesirable rates of speed of operation of other parts of a device with which the hydraulic system is used.

It is an object of the present invention to provide a device which will provide an adjustably predetermined time delay in the operation of any mechanical movement.

It is a further object of the invention to provide such a device which is simple in construction and easy to install and maintain.

It is another object of the invention to provide such a device which will produce a time delay in mechanical operation smoothly, and without jerky movement, or sudden interruptions of movement.

It is still another object of the invention to provide such a device which will be inexpensive to manufacture but will be capable of long, sustained life under constant use.

With these and other objects in view, the invention consists of the construction, arrangement and combination of the various parts of the device whereby the objects contemplated are attained, as hereinafter set forth, pointed out in the appended claims, and illustrated in the accompanying drawings.

Figures 1, 2:
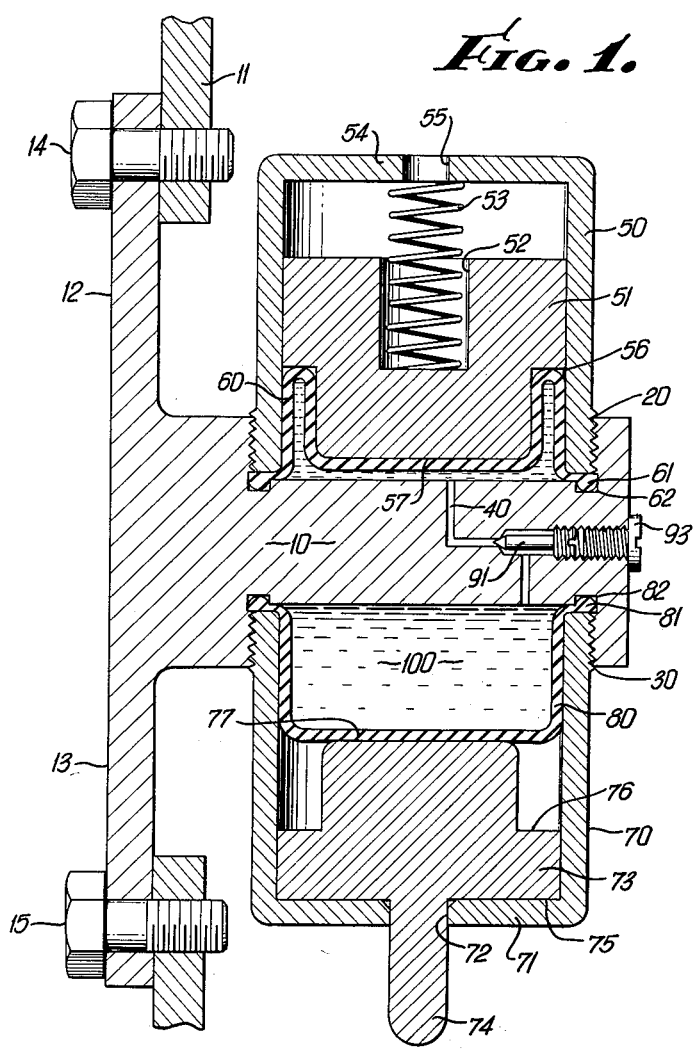
FIGURE 1 is a diagrammatic view of the device, substantially in section.
FIGURE 2 is an enlarged diagrammatic view of the control valve, oil-fill assembly of the device.

A body 10 may be secured to another structure, such as a wall or the body of a mechanical device 11 by any suitable means, such as flanges 12 and 13 and bolts 14 and 15.

Body 10 has a first internally threaded, open-ended recess chamber 20. Body 10 also has a second internally threaded, open-ended recess chamber 30, spaced apart from said first chamber 20. A tubular passageway 40 in said body 10 gives hydraulic fluid access from said chamber 30 to said chamber 20.

A hollow cylinder 50, externally threaded at its open end to mate with the internal threads of chamber 20, is mounted in said chamber 20 and protrudes therefrom. Disposed in said cylinder 50 is a piston 51, which has a recess 52 in one face thereof. Disposed in said recess 52 is spring 53 which impinges against end wall 54 of cylinder 50 so as to bias piston 51 away from said end wall 54. An air outlet 55 is provided in said end wall 54, permitting exhaust of air from the inside of said cylinder 50.

Said piston 51 has an annular open-ended recess 56 formed at the edge of the other face 57 thereof.

An elastoid diaphragm 60 is tightly secured at its edge between body 10 and cylinder 50 by providing said edge with a thickened area 61, disposing said thickened area 61 in an annular groove 62 in body 10, and clamping said diaphragm 60 between said body 10 and cylinder 50 by threading said cylinder 50 into tight relation to said diaphragm 60 and said body 10.

When said device is not in operation, as illustrated in FIGURE 1, said diaphragm 60, tightly secured at its edge as hereinabove described, will be disposed in parallel alignment with face 57 of piston 51, with a fold thereof disposed in parallel alignment with the surfaces of annular recess 56 and with the inside surface of cylinder 50 opposite said recess 56. It has been found that although such relative dimensions are not essential, it is advantageous to have the depth of recess 56 substantially three times the thickness of diaphragm 60. When said recess 56 is of that depth, friction binding does not occur when the device is in operation, as hereinafter described, and hydraulic fluid disposed in said recess 56 between the folds of said diaphragm 60, aids in the smooth operation of the device.

A second hollow cylinder 70, externally threaded at its open end to mate with the internal threads of chamber 30, is mounted in said chamber 30 and protrudes therefrom. Said cylinder 70 has an end wall 71, and substantially at the center of said end wall 71 is an opening 72. Disposed in said cylinder 70 is a piston 73. A plunger 74 is formed on and protrudes outwardly from face 75 of piston 73. Said plunger 74 is slidably disposed in said opening 72 and protrudes outwardly and externally therefrom.

Said piston 73 has an annular open-ended recess 76 formed at the edge of the other face 77 thereof.

A second elastoid diaphragm 80 is tightly secured at its edge between body 10 and cylinder 70 by providing said edge with a thickened area 81, disposing said thickened area 81 in an annular groove 82 in body 10, and clamping said diaphragm 80 between said body 10 and said cylinder 70 by threading said cylinder 70 into tight relation to said diaphragm 80 and said body 10.

When said device is not in operation, said diaphragm 80, tightly secured by its edge as hereinabove described, will be disposed in parallel alignment with the inside surface of cylinder 70, and in parallel alignment with surface 77 of piston 73, but not in recess 76.

As in the case of recess 56 and diaphragm 60, it has been found advantageous to have the depth of recess 76 substantially three times the thickness of diaphragm 80 for the same reason.

An internally threaded, open-ended bore 90 is formed in body 10 between said chambers 20 and 30 and provides access to tubular passageway 40. Threadably disposed in said bore 90 is needle valve 91 disposed so as to control the pressure flow in passageway 40. Needle valve 91 may be provided with a screwdriver slot 92 for ready adjustment of said needle valve 91.

Also threably disposed in said bore 90 externally of needle valve 91 is cap 93, which may also have a screwdriver slot 94.

Hydraulic fluid 100 is provided in cylinder 70, in passageway 40, and generally between diaphragms 60 and 80.

To make the device operative, said hydraulic fluid 100 is introduced into the device by removing cap 93 and needle valve 91, pouring in said fluid 100 through bore 90, setting needle valve 91 at a selected point for chosen hydraulic pressure, and replacing cap 93.

The device, the operation of which is to be delayed, is then brought in contact with tongue 74. Operative movement of said device against said tongue 74 at a pressure exceeding the biasing force of spring 53 will cause tongue 74 and piston 73 to move upwardly. Pressure of piston 73 against diaphragm 80 will cause fluid 100 to flow out of cylinder 70, through passageway 40, and into cylinder 50.

As pressure against tongue 74 continues, piston 73 will continue to move upwardly in cylinder 70, and diaphragm 80 will be distorted so that, because of the back pressure of fluid 100, a fold of diaphragm 80 will be disposed in recess 76, while the rest of diaphragm 80 is forced upwardly, impelled by face 77 of piston 73, while hydraulic fluid 100, passing under pressure controlled by needle valve 91 through passageway 40, will continue to move piston 51 upwardly, against the biasing force of spring 53, causing diaphragm 60 to follow the movement of piston 51 until, at the end of the movement, when piston 51 has reached end wall 54, the relative disposals of diaphragms 80 and 60 are reversed, diaphragm 80 assuming the position shown in reverse position in the drawing for diaphragm 60, and vice versa.

It will be readily understood that the upward movement of tongue 74 will be a relatively slow movement (its speed dependent on the pressure-controlling setting of needle valve 91), cushioned by the hydraulic back-pressure of fluid 100. Consequently, the movement of the device to which the device of the present invention is applied will be smoothly slowed down to the desired speed.

When the pressure against tongue 74 is relieved or removed, pressure of spring 53 on piston 51 will cause the device of the present invention to resume its position illustrated in the drawing, ready for re-use as a time delay device.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures and devices.

What is claimed is:

1. A time delay device comprising: a body member; a first cylinder mounted on said body member; a first piston slidably disposed in said first cylinder; a tongue mounted at one end of said piston and protruding from the adjacent end of said first cylinder; a diaphragm mounted in said first cylinder at the other end of said first piston; a second cylinder mounted on said body member and spaced apart from said first cylinder; a second piston slidably disposed in said second cylinder independently of said first piston; a diaphragm mounted in said second cylinder adjacent one end of said second piston; and a fluid pressure passageway between said first cylinder and said second cylinder.

2. A time delay device as defined in claim 1, including a spring disposed in said second cylinder so as to bias said second piston toward said passageway.

3. A time delay device as defined in claim 1, including an air outlet in said second cylinder.

4. A time delay device comprising: a body member; a first cylinder mounted on said body member; a first piston slidably disposed in said first cylinder; an annular recess at one end of said first piston; a tongue mounted on said first piston at the other end of said first piston and protruding from the adjacent end of said first cylinder; an elastoid diaphragm mounted in said first cylinder and disposed adjacent the recess in said first piston; a second cylinder mounted on said body member and spaced apart from said first cylinder; a second piston slidably disposed in said second cylinder independently of said first piston; an annular recess at one end of said second piston; an elastoid diaphragm mounted in said second cylinder and disposed adjacent the recess in said second piston; and a fluid pressure passageway between said first cylinder and said second cylinder.

5. A time delay device as defined in claim 4, including a spring disposed in said second cylinder and abutting on said second piston at the other end of said second piston so as to bias said second piston toward said passageway.

6. A time delay device as defined in claim 5, including a second recess at the other end of said second piston, and wherein said spring is seated in said second recess in said second piston.

7. A time delay device as defined in claim 6, including an air outlet in said second cylinder.

8. A time delay device as defined in claim 7, wherein the diaphragm and first piston in said first cylinder are disposed relative to each other so that pressure of said first piston against said diaphragm will cause said diaphragm to enter the recess in said first piston in folded position as said pressure is continued.

9. A time delay device as defined in claim 8, wherein the diaphragm in said second cylinder is in folded position in the end recess in said second piston, and said diaphragm and said second piston are disposed relative to each other so that continued pressure of said diaphragm against said second piston will move said second piston and cause said diaphragm to unfold from the annular recess in said second piston.

10. A time delay device comprising: a body member; a first cylinder mounted on said body member; a first piston slidably disposed in said first cylinder; an annular recess at one end of said first piston; a tongue mounted on said first piston at the other end of said first piston and protruding from the adjacent end of said first cylinder; an elastoid diaphragm mounted in said first cylinder and disposed adjacent said recess in said first piston; a second cylinder mounted on said body member, spaced apart from said first cylinder; a second piston slidably disposed in said second cylinder independently of said first piston; an annular recess at one end of said piston; an elastoid diaphragm mounted in said second cylinder and disposed adjacent said recess in said second piston; a fluid pressure passageway between said first cylinder and said second cylinder; and hydraulic fluid in said first and second cylinders between said diaphragms and in said passageway.

11. A time delay device as defined in claim 10, including a needle valve mounted on said body and operatively disposed in said passageway so as to regulate pressure flow through said passageway.

12. A time delay device as defined in claim 11, including a bore in said body giving access to said passageway; and a cap removably mounted in said bore.

13. A time delay device as defined in claim 12, wherein said bore and cap are disposed so as to serve as a sealable inlet for hydraulic fluid into said cylinder and passageway.

14. A time delay device comprising: a body member; a first cylinder mounted on said body member; a first piston slidably disposed in said first cylinder; an annular recess at one end of said first piston; a tongue mounted on said first piston at the other end of said first piston and protruding from the adjacent end of said first cylinder; an elastoid diaphragm transversely mounted in said first cylinder and disposed adjacent the recess in said first piston; a second cylinder mounted on said body member, spaced apart from said first cylinder; a second piston slidably disposed in said second cylinder independently of said first piston; an annular recess at one end of said second piston; an elastoid diaphragm transversely mounted in said second cylinder and disposed adjacent the recess in said second piston; a fluid pressure passageway between said first cylinder and said second cylinder; and hydraulic fluid in said first and second cylinders disposed between said diaphragm and in said passageway, whereby, when pressure is applied to the tongue, hydraulic fluid pressure will move from said first cylinder to said second cylinder through said passageway.

15. A time delay device as defined in claim 14, including an adjustable needle valve disposed in said fluid pressure passageway so as to regulate the speed of travel of said tongue by regulating the speed of flow of said hydraulic fluid from said first cylinder to said second cylinder.

References Cited in the file of this patent

UNITED STATES PATENTS

| | | |
|---|---|---|
| 2,178,953 | Chilton | Nov. 7, 1939 |
| 2,395,940 | Ritter | Mar. 5, 1946 |
| 2,688,150 | Roussel | Sept. 7, 1954 |
| 2,882,042 | Fleckenstein | Apr. 14, 1959 |
| 2,945,689 | Klinger | July 19, 1960 |